United States Patent
Biegelsen et al.

(10) Patent No.: US 6,807,892 B2
(45) Date of Patent: Oct. 26, 2004

(54) PNEUMATIC ACTUATOR WITH ELASTOMERIC MEMBRANE AND LOW-POWER ELECTROSTATIC FLAP VALVE ARRANGEMENT

(75) Inventors: David K. Biegelsen, Portola Valley, CA (US); Warren B. Jackson, San Francisco, CA (US); Lars-Erik Swartz, Sunnyvale, CA (US); Andrew A. Berlin, San Jose, CA (US); Patrick C. Cheung, Castro Valley, CA (US)

(73) Assignee: Xerox Corporation, Stamford, CT (US)

( * ) Notice: Subject to any disclaimer, the term of this patent is extended or adjusted under 35 U.S.C. 154(b) by 58 days.

(21) Appl. No.: 10/335,595

(22) Filed: Dec. 30, 2002

(65) Prior Publication Data

US 2004/0124384 A1 Jul. 1, 2004

(51) Int. Cl.[7] ............................................. F15B 11/08
(52) U.S. Cl. ........................................ 91/459; 91/454
(58) Field of Search ...................... 91/454, 459; 92/90, 92/98 R

(56) References Cited

U.S. PATENT DOCUMENTS

| | | | |
|---|---|---|---|
| 3,209,700 A | * | 10/1965 | Waldherr .................. 92/98 R |
| 3,424,063 A | * | 1/1969 | Norwood .................. 92/98 R |
| 5,744,732 A | | 4/1998 | Kubby et al. |
| 5,839,722 A | * | 11/1998 | Berlin et al. ................. 269/57 |
| 6,120,002 A | | 9/2000 | Biegelsen et al. |
| 6,123,316 A | | 9/2000 | Biegelsen et al. |
| 6,395,638 B1 | * | 5/2002 | Linnemann et al. ......... 438/706 |
| 6,454,260 B1 | * | 9/2002 | Noolandi et al. ........... 273/108 |
| 6,490,960 B1 | | 12/2002 | Jackson et al. |
| 6,590,267 B1 | * | 7/2003 | Goodwin-Johansson et al. 257/415 |

OTHER PUBLICATIONS

Biegelsen et al.; "AirJet Paper Mover: An Example Of Meso–Scale MEMS"; Invited paper at SPIE; Sep. 2000; vol. 4176; pp. 122–129.

* cited by examiner

Primary Examiner—Edward K. Look
Assistant Examiner—Michael Leslie
(74) Attorney, Agent, or Firm—Bever, Hoffman & Harms, LLP; Patrick T. Bever

(57) ABSTRACT

An actuator including a pneumatically distended elastomer membrane that is pressurized and depressurized using electrostatically actuated flap valves laminated onto a printed circuit board. The flap valves close only at zero pressure gradients and flows so that elevated closing and hold-off pressures are achieved. Fluid expelled from the elastomer membranes during collapse are vented through a wall of the actuator. An air jet object mover utilizes an array of the pneumatic actuators as valves to open and close air jet vents. A fiber optic micro-switch utilizes pneumatic actuators to position a mirror.

21 Claims, 6 Drawing Sheets

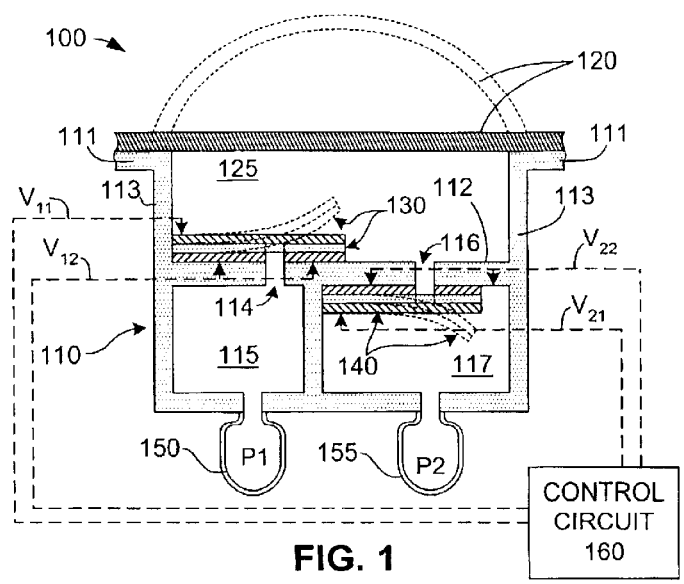
FIG. 1
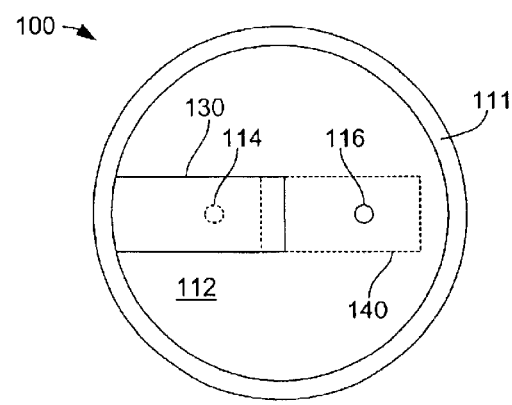
FIG. 2
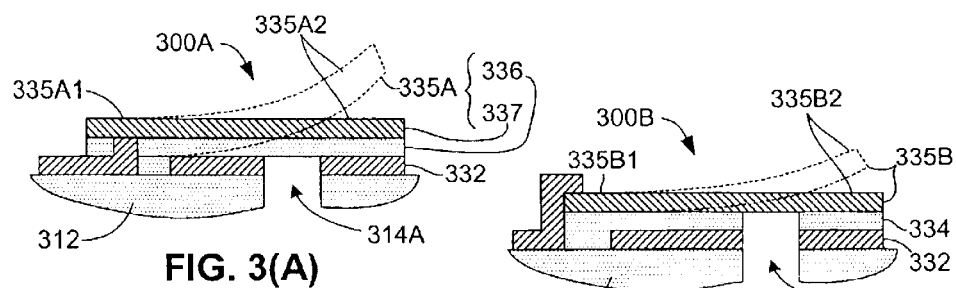
FIG. 3(A)  FIG. 3(B)

PNEUMATIC ACTUATOR WITH ELASTOMERIC MEMBRANE AND LOW-POWER ELECTROSTATIC FLAP VALVE ARRANGEMENT

FIELD OF THE INVENTION

This invention relates to microdevices, and more particularly to pneumatic actuators and micro-valves.

BACKGROUND OF THE INVENTION

Microdevices, such as microfluidic control devices and micromachines, are used in a wide variety of modern devices. Currently, microdevices are used in automobiles, medical instrumentation, or process control applications, and in conjunction with appropriate sensors can provide accurate determinations of pressure, temperature, acceleration, gas concentration, and many other physical or chemical states. Microfluidic control devices include micro-valves for handling gases or liquids, flow gauges, and ink jet nozzles, while micromachines include micro-actuators, movable micro-mirror systems, or even tactile moving assemblies.

Large arrays of micro-valves have particular utility in conjunction with air jet paper transport systems or other material processing systems that must precisely control position and velocity of paper or other objects moving through the system. Commonly, material processing systems control object movement by physically engaging the object with a separate object drive mechanism that moves the object at a predetermined velocity along a predetermined path. For example, gear driven ratchets, rollers, hooks, or conveyors are widely employed to move objects as diverse as paper, semiconductors, plastics, or steel by mechanically engaging the objects, and moving the engaged objects along a desired path at a fixed velocity. While commonplace, mechanical or frictional engagement of objects does have a disadvantage of requiring direct physical contact with an object. In contrast to mechanical or frictional transport systems, object drive mechanisms based on various fluid support techniques have long been employed to move delicate objects without requiring solid mechanical contact. For example, instead of using conventional belts, conveyors or rollers, paper moving through xerographic copier systems can be supported on a laminar air flow, or uplifted and moved by directed air jets. This form of fluid support is particularly advantageous, for example, when sheets of paper carrying unfixed toner images must be moved between a photoconductive drum and a fusing station where the toner image is fixed.

One type of micro-valve used in air jet systems is an electrostatic flap valve, which controls the flow of air passing through a port (orifice) formed in a pressure wall separating a high pressure air source and a paper transport passage. Each electrostatic flap valve typically includes a fixed electrode mounted on the downstream surface of the pressure wall surrounding the port, and a flap member including a flexible electrode that is attached at one end to the pressure wall. Flow through the flap valve is controlled by applying a suitable potential to the fixed and flexible electrodes. To open the flap, thereby allowing fluid to flow from the high-pressure source to the transport passage through the orifice, the potential is removed (turned off), allowing the pressure differential to push the flap open. To subsequently close the flap, the potential is applied (turned on), thereby causing electrostatic attraction between the fixed and flexible electrodes to pull the flap against the pressure wall to close the orifice. One advantage of electrostatic flap valves is that significant power is expended only during valve opening or closing. That is, when flap valves are in an open state or in a closed state, no current flows to maintain either state. Only displacement current flows during valve state transition between the opened and closed states.

A problem with the use of electrostatic flap valves to control fluid flow between high and low pressure regions is that a large force, and therefore a high voltage potential, is required to close the flap against the flow passing through the orifice between the high and low pressure regions. Once the flap is closed, the fixed and flexible electrodes are in very close proximity, and the voltage potential needed to maintain the closed state is relatively small, essentially because the electrostatic force is inversely proportional to the square of the distance between electrodes. However, when the flap is opened, the fixed and flexible electrodes are far apart, and a substantially larger voltage potential is needed to pull the flap closed. Further, the fluid flowing through the orifice applies a force against the flap that further increases the needed voltage potential, and if large enough, this force can prevent closure even when extremely high voltages are used. These voltages are ultimately limited by breakdown mechanisms between the fixed and flexible electrodes. Accordingly, when electrostatic flap valves are utilized in this manner, the pressure gradient across the high and low-pressure regions is limited by the available voltage potential to allow closure of the flap.

Microdevice actuators often include micromachined monocrystalline structures or piezoelectric devices to perform a desired operation, such as to position a micro-mirror in a fiber-optic micro-switch. However, both monocrystalline structures and piezoelectric devices are relatively expensive to produce, and require relatively high voltage sources to produce required positioning forces.

What is needed is a cost effective pneumatic valve and a cost effective pneumatic actuator that can be driven using low voltages and low power. What is also needed is an inexpensive pneumatic valve for controlling high-pressure fluid flows.

SUMMARY OF THE INVENTION

The present invention is directed to a low-cost pneumatic actuator that facilitates both low-power micro-valve and low-power micro-actuator functions by utilizing a pair of electrostatic flap valves to control the flow of a fluid into an expandable chamber such that the electrostatic flap valves are only closed under equilibrium (i.e., zero flow) conditions or approximate thereto (e.g., zero to 10% of the full flow rate) such that minimal force is needed to close the valves.

The pneumatic actuator includes a housing defining a cavity, an elastomeric membrane (e.g., a silicone film) mounted over the cavity to form an expandable chamber, and a pair of electrostatic flap valves for controlling fluid flow into and out of the expandable chamber. According to an aspect of the present invention, a first electrostatic flap valve is mounted inside the expandable chamber such that it is positioned to selectively block fluid flow into the chamber through a first orifice, and a second electrostatic flap valve is mounted outside the expandable chamber such that it is positioned to selectively block fluid flow out of the chamber through a second orifice. In one embodiment, the first orifice is connected to a high-pressure source, and the second orifice is connected to a low-pressure source (e.g., to the external atmosphere through a vent hole formed in an upper wall of the housing).

During operation, the elastomeric membrane is distended (stretched) by releasing the first electrostatic flap valve (i.e., causing an associated control circuit to turn off the control signals transmitted to the first flap valve) while maintaining the second electrostatic flap valve in a closed position, thereby allowing the high pressure gradient across the first orifice to push the first flap valve open. When the pressure gradient across the electrostatic membrane is balanced by the elastic restoring force of the distended membrane, flow into the cavity stops. It then requires negligible electrostatic force to close the first flap valve. Conversely, the elastomeric membrane is subsequently collapsed by releasing the second electrostatic flap valve while maintaining the first electrostatic flap valve in a closed position, thereby allowing the high pressure inside the expandable chamber to escape through the second orifice. According to the present invention, the first electrostatic flap valve is only actuated to block the first orifice when an internal pressure of the expandable chamber is approximately equal to the pressure supplied by the high pressure source, and the second electrostatic flap valve is only actuated to block the second orifice when the internal pressure of the expandable chamber is approximately equal to the exhaust pressure (for example, atmospheric pressure). As described above, conventional arrangements require at least one valve to close against the flow of gas through the orifice, which requires a voltage much higher than that needed to hold off the static pressure. Unlike these conventional arrangements, neither flap valve of the pneumatic actuator is required to close against the flow of fluid. Accordingly, the present invention provides a mechanism for repeatedly expanding and contracting an expandable chamber that requires voltages sufficient only to hold off the pressure gradient. Alternatively, the same voltage may be used as for conventional arrangements, but much higher pressures can be utilized.

According to an embodiment of the present invention, an array of pneumatic actuators are formed on a housing that is fabricated using substantially conventional printed circuit board fabrication techniques. By utilizing the conventional printed circuit board fabrication techniques to construct the housing, the manufacturing costs associated with the production and electronic driving of the pneumatic actuator array are significantly lower than the costs associated with the production of conventional micro-actuator arrays.

According to another embodiment of the present invention, the pneumatic actuator array of the present invention is utilized as a fluid control valve array in which the distendable portions of the elastomeric membrane are positioned to selectively block, for example, air jet ports in an air jet paper (or other object) transport system. This arrangement overcomes problems associated with conventional air jet arrays that utilize electrostatic flap valves to directly open and close associated air jets. In particular, unlike conventional air jets in which the flap valve must close against the flow of air, the electrostatic flap valves of each pneumatic actuator open and close when pressure inside the distended membrane is equalized. Therefore, the limitation on conventional air jet flows, which is limited by the ability of the flap valves to close off through their flow fields, is eliminated in paper handling systems that incorporate the pneumatic actuators of the present invention. Accordingly, a much higher paper transport air pressure may be provided than that usable in conventional air jet paper handling systems, which facilitates improved control over paper movement through the system.

According to yet another embodiment of the present invention, the pneumatic actuator of the present invention is utilized as a micromachine to control the position or orientation of an object, such as a micro-mirror structure in a fiber-optic micro-switch, thereby providing a low cost, low voltage, low-power alternative to conventional actuators.

BRIEF DESCRIPTION OF THE DRAWINGS

These and other features, aspects and advantages of the present invention will become better understood with regard to the following description, appended claims, and accompanying drawings, where:

FIG. 1 is a cross-sectional side view showing a pneumatic actuator according to a simplified embodiment of the present invention;

FIG. 2 is a top view showing a portion of the pneumatic actuator of FIG. 1;

FIGS. 3(A) and 3(B) are cross-sectional side views showing alternative electrostatic flap valve arrangements that can be utilized in the pneumatic actuator of FIG. 1;

DETAILED DESCRIPTION OF THE DRAWINGS

Figure 4A:
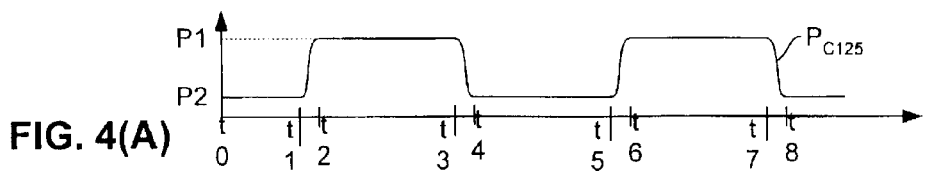
FIG. 4(A) is a timing diagram depicting pressure changes inside an expandable chamber of the pneumatic actuator of FIG. 1 during a first operational example.

FIGS. 1 and 2 are cross-sectional side and simplified top views, respectively, showing a pneumatic actuator 100 according to an embodiment of the present invention. As indicated in FIG. 1, pneumatic actuator 100 generally includes a housing 110 and elastomeric membrane 120 that form an expandable chamber 125 that is selectively altered (i.e., expanded into the distended condition indicated by dashed lines, or contracted into the flattened condition depicted by shading and solid lines) by selectively opening and closing first and second electrostatic flap valves 130 and 140.

Housing 110 includes a rigid upper wall 111, a rigid lower wall 112, and one or more rigid side walls 113 that form a cavity having an open end (i.e., defined by an opening formed in upper wall 111). A first orifice 114 and a second orifice 116 are formed through lower (pressure) wall 112. First orifice 114 is formed between expandable chamber 125 and a first (e.g., high) pressure source 150 by way of a first conduit (plenum) 115. Similarly, second orifice 116 is formed between expandable chamber 125 and a second (e.g., low) pressure source 155 by way of a second conduit 117. As set forth in detail below, housing 110 is preferably formed using low cost printed circuit board technologies, but can also be constructed using a variety of machining or micromachining techniques, including those associated with conventional integrated circuit fabrication. For example, chemical etching, electron beam lithography, photolithography, or other standard integrated circuit batch processing technologies can be used to define necessary air conduits, control or circuitry conduits, holes, orifices, and openings. Alternatively, injection molding, high precision numerically controlled machines, or stereo lithography can be employed for low cost batch construction of housing 110. Materials used in construction may include plastics, metals, glasses, or ceramics. In one possible embodiment, plastics, epoxies, glass, silicon, polysilicon, silicon nitride, silicon, silicon oxide, oxynitride, plastics or aluminum, or any other available material suitable for lithographic processing or laser, chemical or mechanical patterning and lamination can be used to define the various structures of housing 110.

Elastomeric membrane 120 is formed on an upper surface of upper wall 111, and includes a distendable portion 121 extending over the cavity formed in housing 110 such that distendable portion 121 forms expandable chamber 125 with side wall 113 and lower wall 112. Elastomeric membrane 120 is formed, for example, by depositing or laminating a silicone film in accordance with known techniques. In other embodiments, rubberized silicone or other elastomeric materials that are expandable in the manner described herein may be used.

First electrostatic flap valve 130 and second electrostatic flap valve 140 are controlled by a control circuit 160, which generates control signals having appropriate timing and amplitude to selectively open and close orifices 114 and 116, respectively. First electrostatic flap valve 130 is positioned to control fluid flow through first orifice 114, and second electrostatic flap valve 140 is positioned to control fluid flow through second orifice 116. Control circuit 160 selectively asserts/de-asserts one or more first control signals (e.g., $V_{11}$ and $V_{12}$) to control the operation (i.e., open or close condition) of first electrostatic flap valve 130, and one or more second control signals (e.g., $V_{21}$ and $V_{22}$) to control the operation of second electrostatic flap valve 140 according to the operation described below.

FIGS. 3(A) and 3(B) are cross sectional side views showing alternative electrostatic flap valves 300A and 300B that can be utilized to implement flap valves 130 and 140 of pneumatic actuator 100.

Referring to FIG. 3(A), electrostatic flap valve 300A includes a lower electrode 332 (e.g., copper) that is formed on a non-conductive wall 312, and a flexible flap 335A including a lower, non-conductive film 336 (e.g., Mylar) and an upper conductive thin film 337 (e.g., aluminum). Lower electrode 332 is fixedly formed on a wall 312, and an orifice 314A is formed through both wall 312 and lower electrode 332. A fixed end 335A1 of flap 335A is adhered or otherwise attached to wall 312 either directly or through an intervening structure (e.g., a portion of lower electrode 332). A free end 335A2 of flap 335A extends over orifice 314A in a manner similar to that shown in FIG. 2. When a suitable potential is applied across fixed electrode 332 and upper conductive thin film 337, flexible flap 335A is held against wall 312 by electrostatic force, thereby blocking orifice 314A. Conversely, when the potential is removed, flexible flap 335A is free to bend away from wall 312, as indicated in dashed lines. Electrostatic flap valves of the type shown in FIG. 3(A) are described in additional detail, for example, in "AirJet paper mover: An example of meso-scale MEMS", David Biegelsen et al., Proceedings of SPIE, Vol. 4176, pp. 122–129 (2000), which is incorporated herein by reference in its entirety.

Referring to FIG. 3(B), similar to electrostatic flap valve 300A (FIG. 3(A)), electrostatic flap valve 300B includes lower electrode 332 formed on wall 312. However, electrostatic flap valve 300B is distinguished from electrostatic flap valve 300A in that a fixed non-conductive film 334 is formed on lower electrode 332, and a flexible flap 335A is entirely formed using a conductive thin film (e.g., aluminum). Orifice 314B is formed through wall 312, lower electrode 332, and non-conductive film 334. A fixed end 335B1 of flap 335B is attached to wall 312, and a free end 335B2 of flap 335B extends over orifice 314B in a manner similar to that described above. Flap 335B is controlled in a manner similar to that described above with reference to flap 335A. Electrostatic flap valves of the type shown in FIG. 3(B) are described in additional detail, for example, in co-owned U.S. Pat. No. 6,120,002, David Biegelsen et al., which is incorporated herein by reference in its entirety.

Referring again to FIG. 1, according to a first aspect of the present invention, first electrostatic flap valve 130 is formed inside expandable chamber 125, and second electrostatic flap valve 140 is formed outside of expandable chamber 125. In particular, first electrostatic flap valve 130 is mounted on an inside surface of lower wall 112 such that it opens into expandable chamber 125, and second electrostatic flap valve 140 is mounted on an outside surface of lower wall 112 such that it opens away from expandable chamber 125. Accordingly, as set forth in detail below, first electrostatic flap valve 130 is actuated to block orifice 114 only when an internal pressure of expandable chamber 125 is equal to the pressure supplied by first pressure source 150, and second electrostatic flap valve 140 is actuated to block orifice 116 only when the internal pressure of expandable chamber 125 is equal to the pressure supplied by second pressure source 155. (The actuation voltage transitions can, in fact, be asserted at any time, but the valves switch only when the flows drop to levels low enough to allow the electrostatic forces to exceed the flap opening forces. In typical operation delay times, determined by experiment or simulation, are inserted between opening of one valve of a pair and closure of the next. It is also possible to integrate pressure sensing or flow means within each chamber 125 to feedback information to the controller to enable switching time determination.) As described above, conventional arrangements require at least one valve to close against the flow of gas through the orifice, which requires a significant amount of power. Unlike these conventional arrangements, neither first electrostatic flap valve 130 nor second electrostatic flap valve 140 is required to close against the flow of fluid through orifices 114 and 116, respectively. Accordingly, the present invention provides a mechanism for repeatedly expanding and contracting expandable chamber 125 that requires significantly less operating voltage and power than conventional arrangements.

Figure 4B:
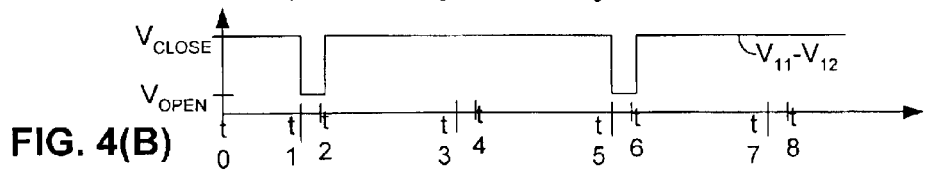
FIGS. 4(B) and 4(C) are timing diagrams depicting operating voltages applied to the electrostatic flap valves during the first operational example.
Figure 4C:
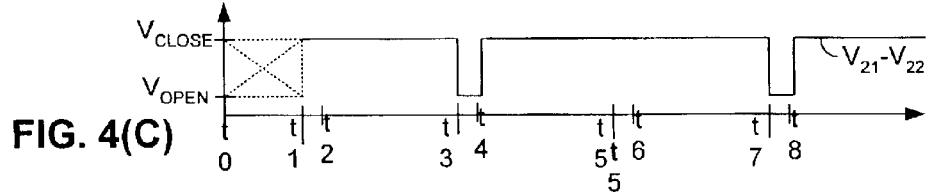

FIGS. 4(A) through 4(C) and 5(A) through 5(D) are diagrams illustrating the operation of pneumatic actuator 100 in additional detail. FIG. 4(A) is a timing diagram depicting the pressure inside expandable chamber 125 according to an operational example. FIGS. 4(B) and 4(C) are timing diagrams depicting operating voltages applied to first electrostatic flap valve 130 and second electrostatic flap valve 140 during the operational example of FIG. 4(A). FIGS. 5(A) through 5(D) are partial cross-sectional side views showing pneumatic actuator 100 during the operational example associated with FIGS. 4(A) through 4(C).

Referring to FIG. 4(A), the present example begins at a time t0, when the pressure $P_{C125}$ inside chamber 125 is substantially equal to the lower pressure source 155 (i.e., pressure P2). At this point elastomeric membrane 120 is substantially deflated (flat, e.g., as depicted in solid lines in FIG. 1, and in dashed lines in FIG. 5(A)). Note that the "flatness" of membrane 120 assumes the atmospheric pressure outside membrane 120 is substantially equal to pressure P2. As indicated in FIG. 4(B), due to the high pressure gradient across orifice 114, the control voltage potential $V_{11}$–$V_{12}$ applied across electrostatic flap valve 130 must be maintained at a sufficiently high value (i.e., $V_{CLOSE}$) to prevent its flap from bending inward. Conversely, as indicated in FIG. 4(C), because the pressure gradient across orifice 116 is zero when $P_{C125}$ is equal to P2, the control voltage potential $V_{21}$–$V_{22}$ applied across electrostatic flap valve 140 can be either zero ($V_{OPEN}$) or at a high value ($V_{CLOSE}$), as indicated by the "X" located between times t0 and t1. Note that in one embodiment, the flexible conductor of each electrostatic flap valve is connected to a fixed voltage source (e.g., $V_{11}$ and $V_{21}$ equal zero Volts), and the control voltage potential of each electrostatic flap valve is determined by the control voltages $V_{12}$ and $V_{22}$ that are transmitted to the fixed electrode associated with electrostatic flap valve.

Figure 5A:
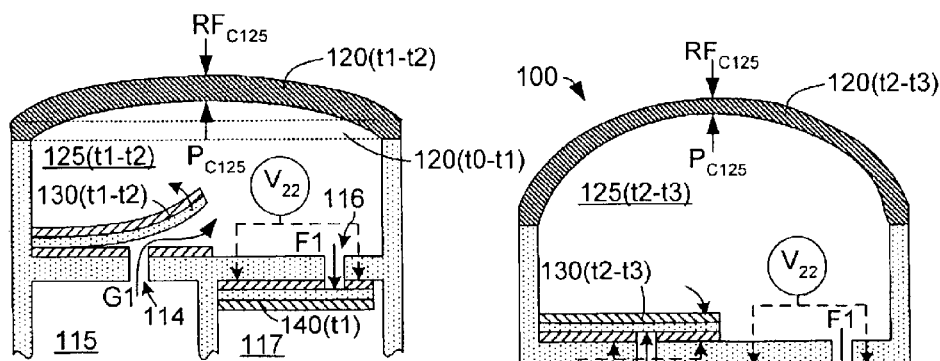
FIGS. 5(A) through 5(D) are partial cross-sectional side views showing the pneumatic actuator of FIG. 1 during the first operational example associated with FIGS. 4(A) through 4(C)

Referring to FIG. 4(B), at time t1 the control signal supplied to electrostatic flap valve 130 (i.e., voltage potential $V_{11}$–$V_{12}$) is turned off (i.e., switched from $V_{CLOSE}$ to $V_{OPEN}$). When the electrostatic force holding electrostatic flap valve 130 is turned off, the force caused by the pressure gradient across orifice 114 pushes the flap open, as indicated in FIG. 5(A), causing a fluid flow G1 (e.g., air or another electrically insulating gas or liquid) into chamber 125. As indicated in FIG. 4(A), inflow of fluid into chamber 125 causes pressure $P_{C125}$ to increase from P2 (at time t1) to P1 (at time t2). As indicated in FIG. 5(A), the increasing chamber pressure $P_{C125}$ causes elastomeric membrane 120 to distend (expand). Note also that the increasing chamber pressure $P_{C125}$ also creates a gradual increasing force F1 on electrostatic flap valve 140 (i.e., through orifice 116). Accordingly, as indicated in FIG. 4(C), the control signal supplied to electrostatic flap valve 140 (i.e., voltage potential $V_{21}$–$V_{22}$) must be turned on (i.e., $V_{OPEN}$) during time t1 to time t2 to prevent this flap valve from opening.

Figure 5B:
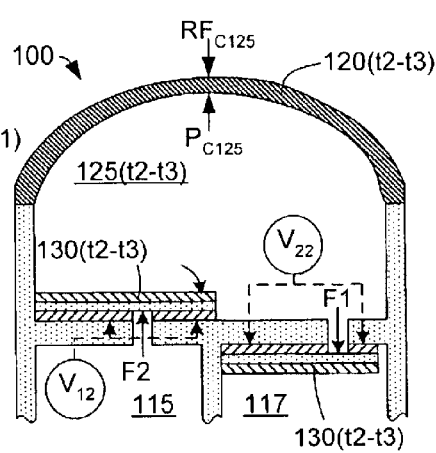

FIG. 5(B) shows pneumatic actuator 100 when the pressure inside expandable chamber 125 reaches equilibrium with first pressure source 150 (i.e., chamber pressure $P_{C125}$ equals pressure P1, as indicated in FIG. 4(A)). At time t2, elastomeric membrane 120 becomes fully distended (i.e., the outward force caused by chamber pressure chamber pressure $P_{C125}$ is balanced by a resisting force $RF_{C125}$ (i.e., tensile forces produced by the stretched membrane plus external pressure). Also note that the force F1 on electrostatic flap valve 130 during time t2 to t3 is maximized, thereby requiring maintenance of the applied control voltage.

According to an aspect of the present invention, the gas flow through orifice 114 at time t2 ceases (i.e., when chamber pressure $P_{C125}$ equals pressure P1; see FIG. 4(A)) thereby allowing the actuation of electrostatic flap valve 130 using a much lower voltage than if closed against fluid flow. That is, once chamber pressure $P_{C125}$ equalizes, gas flow G1 through orifice 114 (see FIG. 5(A)) ceases and the force F2 applied to the bottom of flap valve 130 drops to zero. Accordingly, as shown in FIG. 4(B), at any point after time t2, the voltage potential $V_{11}$–$V_{12}$ across flap valve 130 is turned on (i.e., increased from $V_{OPEN}$ to $V_{CLOSE}$), and flap valve 130 is actuated (i.e., closed) using substantially less power than if closed under non-equilibrium conditions. By only closing electrostatic flap valve 130 when chamber pressure $P_{C125}$ is equal to pressure P1, a pneumatic actuator is provided that requires very little power.

Figure 5C:
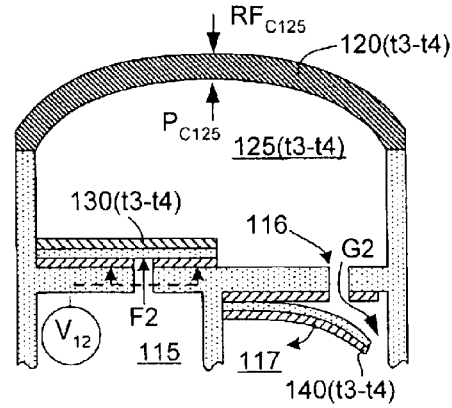

Subsequently, at a desired time t3, the control signal supplied to electrostatic flap valve 140 (i.e., voltage potential $V_{21}$–$V_{22}$) is turned off (i.e., switched from $V_{CLOSE}$ to $V_{OPEN}$). When the electrostatic force holding electrostatic flap valve 140 is turned off, the force caused by the pressure gradient across orifice 116 pushes the flap open, as indicated in FIG. 5(C), causing a fluid flow G2 out of chamber 125. As indicated in FIG. 4(A), fluid outflow from chamber 125 causes pressure $P_{C125}$ to decrease from P1 (at time t3) to P2 (at time t4). As indicated in FIG. 5(C), the decreasing chamber pressure $P_{C125}$ reduces outward pressing force relative to resisting force $RF_{C125}$, thereby causing elastomeric membrane 120 to begin to shrink. Note that as chamber pressure $P_{C125}$ decreases from P1, a gradually increasing force F2 is applied to electrostatic flap valve 130 (i.e., through orifice 114), which remains closed due to the applied control signal.

Figure 5D:
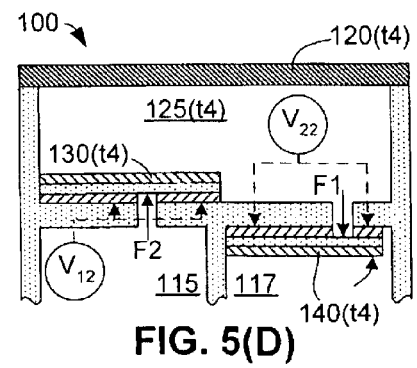

FIG. 5(D) shows pneumatic actuator 100 after time t4 when the pressure inside expandable chamber 125 reaches equilibrium with second pressure source 155 (i.e., chamber pressure $P_{C125}$ equals pressure P2, as indicated in FIG. 4(A)), and gas flow through orifice 116 ceases. Accordingly, as shown in FIG. 4(C), similar to the operation of electrostatic flap valve 130, electrostatic flap valve 140 can be actuated (closed) after time t4 using a much lower voltage than if closed against fluid flow.

As indicated in FIGS. 4(A) though 4(C), subsequent operation of pneumatic actuator 100 is then repeated by repeating the application of operating voltages as set forth above. Accordingly, as set forth in the practical examples provided below, the present invention provides a highly efficient pneumatic actuator in which a minimal amount of force is required to actuate electrostatic flap valves 130 and 140.

Note that, in the above example, the gas flow rates G1 and G2 indicated in FIGS. 5(A) and 5(C), along with the forces F1 and F2 indicated in FIGS. 5(B) and 5(D), are determined by the pressure gradient (P2–P1) across the respective flap valves, and by the diameters of orifices 114 and 116. Increasing the diameter of orifices 114 and 116 would increase the force F1 and F2, thereby requiring greater potentials for holding the flap valves closed, but would reduce the time constant (e.g., t2–t1) required to equalize the pressure in expandable chamber 125. Conversely, reducing the diameters of orifices 114 and 116 decreases the amount of power required to hold electrostatic flap valves 130 and 140 closed, but would increase the time constant required to equalize the pressure in expandable chamber 125. Therefore, those skilled in the art will recognize that an optimal orifice size for a given application will be determined by power or voltage versus performance considerations.

Figure 6:
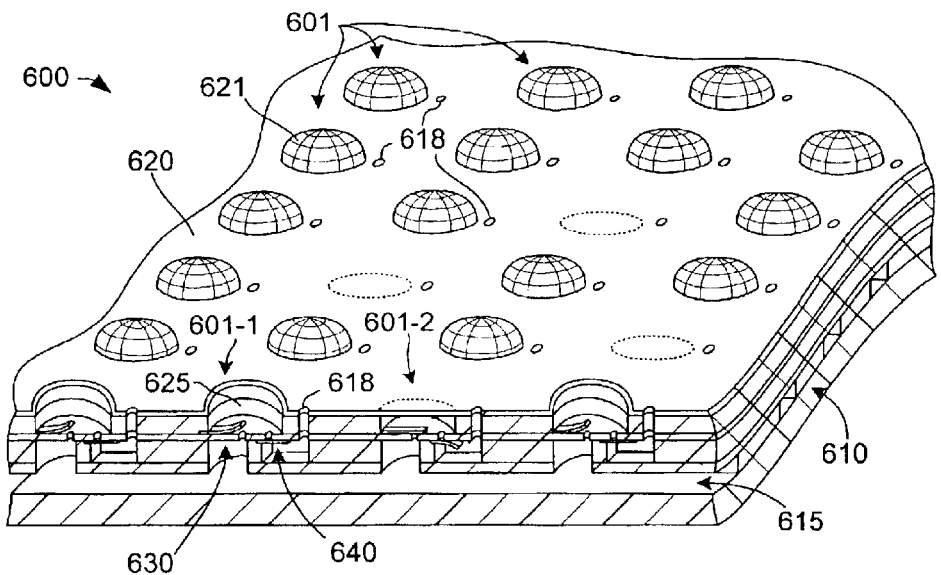
FIG. 6 is a perspective view showing a portion of a pneumatic actuator array according to another embodiment of the present invention.

FIG. 6 is a partial perspective view showing a pneumatic actuator array 600 including several pneumatic actuators 601 arranged in accordance with a first practical embodiment of the present invention. Pneumatic actuator array 600 may be used essentially as shown in FIG. 6 as a tactile stimulator, such as a refreshable Braille display wherein the pneumatic actuators 601 form Braille dots that extend and retract to form Braille characters. In other embodiments, pneumatic actuator array 600 may be used as variable data lithographic marking engines. In yet another embodiment, pneumatic actuator array 600 may be used as variable data display device. Moreover, as exemplified by specific embodiments set forth below, pneumatic actuator array 600 may be incorporated into any of various apparatus that utilize pneumatic actuators 601 to perform various micro-valve and micro-actuator functions.

Referring to FIG. 6, array 600 generally includes a housing 610 that defines several open-topped cavities, and a sheet 620 of elastomeric material (e.g., silicone) that is formed on an upper surface of housing 610. As indicated by pneumatic actuator 601-1, each pneumatic actuator 601 includes an expandable chamber 625 formed by a section (elastomeric membrane) 621 of elastomeric sheet 620 located over an associated cavity formed by housing 610. Each pneumatic actuator 601 also includes a first electrostatic flap valve 630 located inside of expandable chamber 625, and a second electrostatic flap valve 640 located outside of expandable chamber 625. As discussed in additional detail below, first electrostatic flap valve 630 is controlled to facilitate fluid flow from first (high) pressure source (not shown) by way of a plenum 615 into expandable chamber 625, and second electrostatic flap valve 640 is controlled to facilitate fluid flow from expandable chamber 625 to the external atmosphere (i.e., second pressure source) through an exhaust port 618 defined in upper wall 611 (and through a corresponding opening 625 formed in elastomeric sheet 620). Accordingly, each pneumatic actuator 601 operates essentially as described above with reference to simplified pneumatic actuator 100 to change between a distended state (e.g., as indicated by pneumatic actuator 601-1) and a contracted (deflated) state (e.g., as indicated by pneumatic actuator 601-2).

Figure 7:
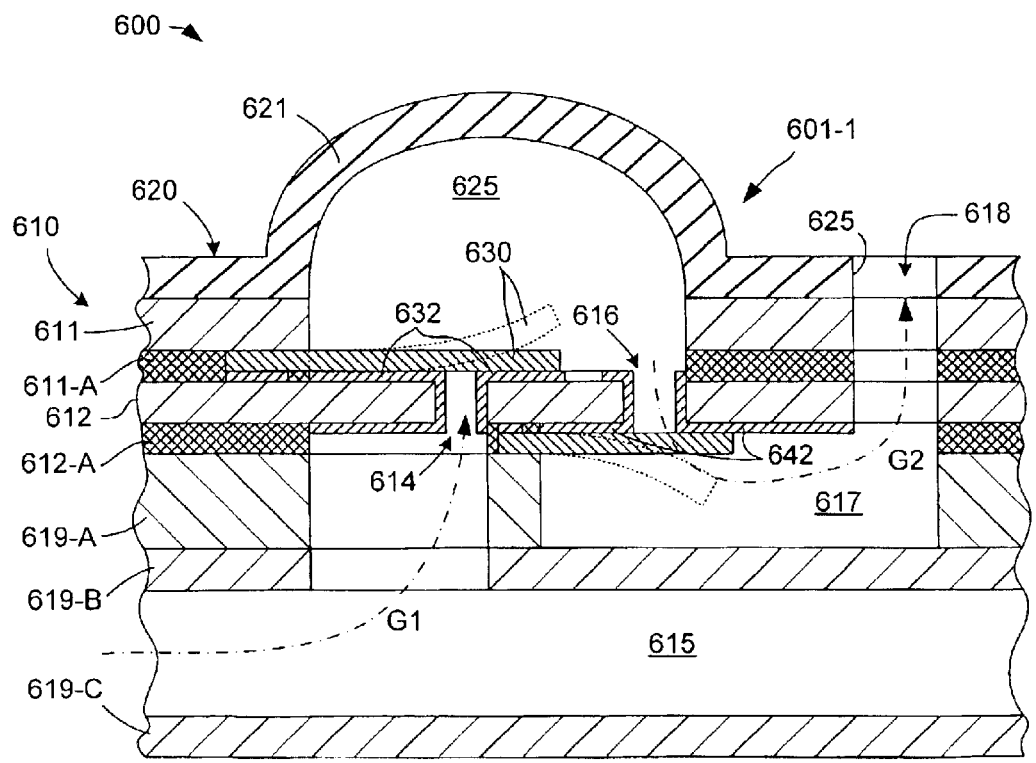
FIG. 7 is a cross-sectional side view showing an actuator of the pneumatic actuator array of FIG. 6 in additional detail.

FIG. 7 is an enlarged cross-sectional side view showing a portion of pneumatic actuator array 600 that shows pneumatic actuator 601-1 in additional detail. According to another aspect of the present invention, housing 610 includes an upper plate 611, a printed circuit board (lower wall) 612 positioned in spaced apart parallel relationship to upper plate 611, and a series of lower plates 619A, 619B, and 619C that define plenum 615 and other support structures described below. Printed circuit board (PCB) 612 is fabricated using standard methods with an array of holes having diameters in the range of 25 microns to several millimeters or larger, depending upon the desired gas flow impendence versus power/voltage considerations. These holes act as vias both for connecting the lower and upper copper traces, which are used to form fixed electrodes 632 and 642, as well as for defining orifices 614 and 616. Next, upper plate 611 (e.g., acrylic) is attached to PCB 612 using a suitable adhesive layer 611-A such that a fixed end of first electrostatic flap valve 630 is sandwiched between upper plate 611 and PCB 612, and a free end of first electrostatic flap valve 630 extends over orifice 614. Similarly, a first lower plate 619A is attached to PCB 612 using a suitable adhesive layer 612-A such that a fixed end of second electrostatic flap valve 640 is sandwiched between lower plate 619A and PCB 612, and a free end of second electrostatic flap valve 640 extends over orifice 616. Note that first electrostatic flap valve 630 and second electrostatic flap valve 640 are connected to corresponding conductors formed on PCB 612, either at each valve location using the structure shown in FIG. 3(A), or in common at sites peripheral to the array using the structure indicated in FIG. 3(B). A second lower plate 619B is then attached to first lower plate 619A to form an exhaust port 617 that communicates with vent hole 618 formed in upper plate 611. Note that exhaust port 617 and vent hole 618 communicate through an opening 625 formed in elastomeric sheet 620. A third lower plate 619C is then connected below plate 619B using an intervening brace (not shown) to form plenum 615. In another embodiment (not shown), exhaust port 617 may be similarly structured to vent through third lower plate 619C. By utilizing the conventional printed circuit board fabrication techniques to construct housing 610, the manufacturing costs associated with the production of pneumatic actuator array 600 are significantly lower than the costs associated with the production of conventional arrays.

During operation, in a manner similar to that described above, the various actuators 601 of pneumatic actuator array 600 are selectively expanded and contracted using control signals transmitted on PCB 612 using known techniques. As mentioned above, in some embodiments (e.g., tactile simulators and various control apparatus), each actuator 601 is addressed individually, whereas in other embodiments, actuators 601 are addressed in groups. In yet other embodiments, every actuator of array 600 may be expanded and contracted simultaneously, for example, to lift an object mounted over the actuators.

As mentioned above, in addition to the uses described above, the pneumatic actuators of the present invention may be incorporated into selected apparatus to perform various micro-valve and micromachine functions. Examples of such apparatus will now be described.

Figure 8:
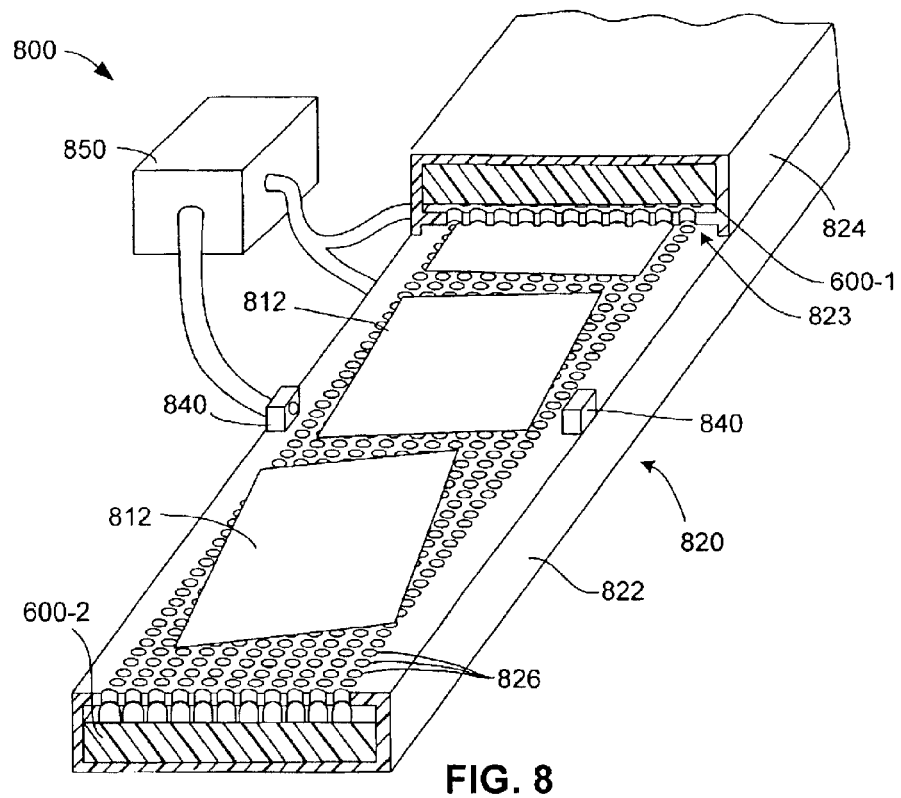
FIG. 8 is a cut-away perspective view showing a paper handling system for accurately moving air jet supported papers at high speeds using valve arrays formed in accordance with another embodiment of the present invention.

FIG. 8 is a cut-away perspective view showing a paper handling system 800 for moving air jet supported papers 812 at high speeds using pneumatic actuators as micro-valves to control the air jets in accordance with another embodiment of the present invention. Similar to conventional air jet systems, paper handling system 800 includes a conveyor 820 that is divided into a lower section 822 and an upper section 824. For clarity, upper section 824 is cut away to better illustrate paper movement along conveyor 820. However, it will be appreciated that upper section 824 and lower section 822 are substantially coextensive. Sections 822 and 824 are maintained in spaced apart relationship to define a passage (low pressure region) 823 therebetween, with the passage sized to accommodate the passage of paper 812. Each section 822 and 824 defines a plurality of air jets (openings) 826 that are selectively controlled in the manner described below to move paper sheets 812 along passage 823.

In accordance with the present invention, at least some of the adjustable air jets 826 are controlled by corresponding pneumatic actuators to propel paper sheets 812 along passage 823. In one embodiment, as shown in FIG. 8, lower section 822 includes a first pneumatic actuator array 600-1, and upper section 824 includes a second pneumatic actuator array 600-2. In the disclosed embodiment, first and second pneumatic actuator arrays are similar to array 600, which is described above with reference to FIG. 6, with each actuator being positioned opposite to a corresponding air jet 826 in the manner described below with reference to FIG. 9. In an alternative embodiment, an array including actuators similar to those shown in FIG. 1 may be utilized. Each array 600-1 and 600-2 receives control signals from a control circuit 850, which utilizes feedback signals from one or more sensors 840 to dynamically support, move, and guide paper sheets 812 along passage 823 according to known control techniques.

Figure 9:
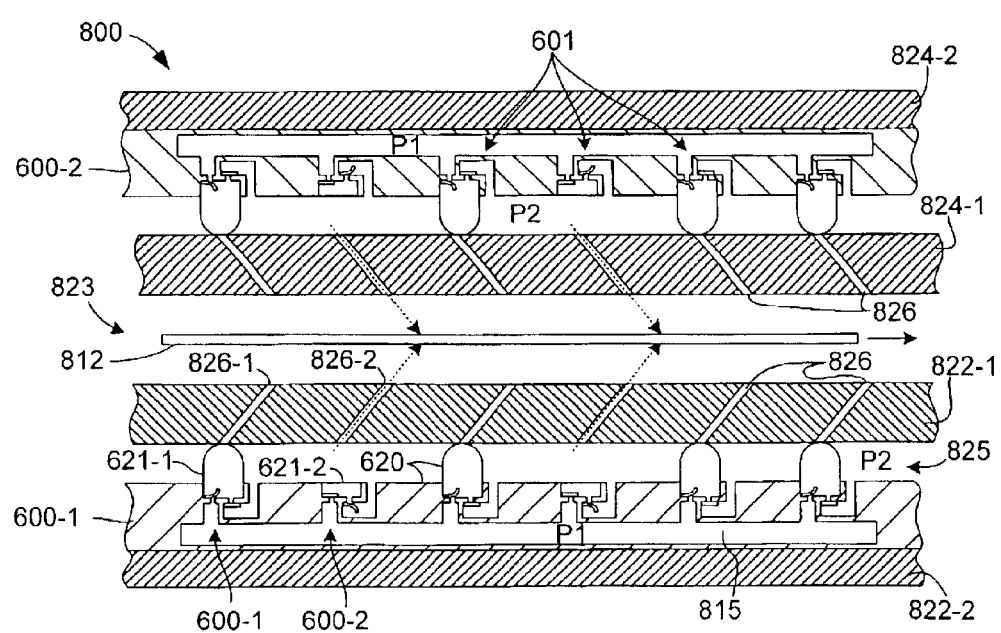
FIG. 9 is a cross-sectional side view showing a section of the paper handling system of FIG. 8.

FIG. 9 is a simplified cross-sectional side view showing a portion of paper handling system 800 in additional detail. First pneumatic actuator array 600-1 is mounted between an inside wall 822-1 and an outside wall 822-2 of lower section 822 such that a high pressure region 825 is provided between elastomeric membrane 620 of array 600-1 and inside wall 822-1. Similarly, pneumatic actuator array 600-2 is mounted between an inside wall 824-1 and an outside wall 824-2 of upper section 824. Inside walls 822-1 and 824-1 define air jets 826, which are angled in the manner shown in FIG. 9 to facilitate the movement of sheet 812 along passage 823. Each air jet 826 is controlled by a corresponding actuator 601 such that the air jet 826 is blocked (closed) when the corresponding actuator is distended, and opened when the corresponding actuator is collapsed. For example, referring to the lower portion of FIG. 9, actuator 601-1 is actuated such that membrane section 621-1 is distended to block the inlet of corresponding air jet passage 826-1, thereby preventing the flow of air from high pressure region to passage 823. In contrast, membrane section 621-1 of actuator 601-2 is collapsed and therefore separated from the inlet of corresponding air jet passage 826-2, thereby facilitating the flow of air from high pressure region to passage 823. By selectively controlling actuators 601 of both arrays 600-1 and 600-2 to press portions of elastomeric membrane against inner walls 822-1 and 824-1, air jets 826 can be turned on and off in a pattern known to those familiar with air jet paper movers to facilitate the movement of paper sheet 812 along passage 823.

In accordance with an aspect of the present invention, use of arrays 600-1 and 600-2 to control air jets 826 overcomes a problem associated with conventional air jet arrays that utilize electrostatic flap valves to directly open and close associated air jets. In particular, unlike conventional air jets in which the flap valve must close against the flow of air, the electrostatic flap valves of each actuator 601 open and close when pressure inside the distended membrane is equalized, as set forth in detail above. Therefore, the limitation on conventional air jet flows, which is limited by the ability of the flap valves to close off through their flow fields, is eliminated in paper handling system 800. Accordingly, a much higher air pressure P2 may be provided in high pressure region 825 than that usable in conventional air jet paper handling systems, which facilitates improved control over the movement of sheet 812 through passage 823.

Note that in order for actuators 601 to vent into high pressure region 825, as described above with reference to FIGS. 6 and 7, the valve pressure P1 provided in plenum 815 of each array must be greater than pressure P2 provided in high pressure region 825. As in the previously described embodiments, system response times are set by size of the valve orifices and pressure difference P1–P2.

Figure 10:
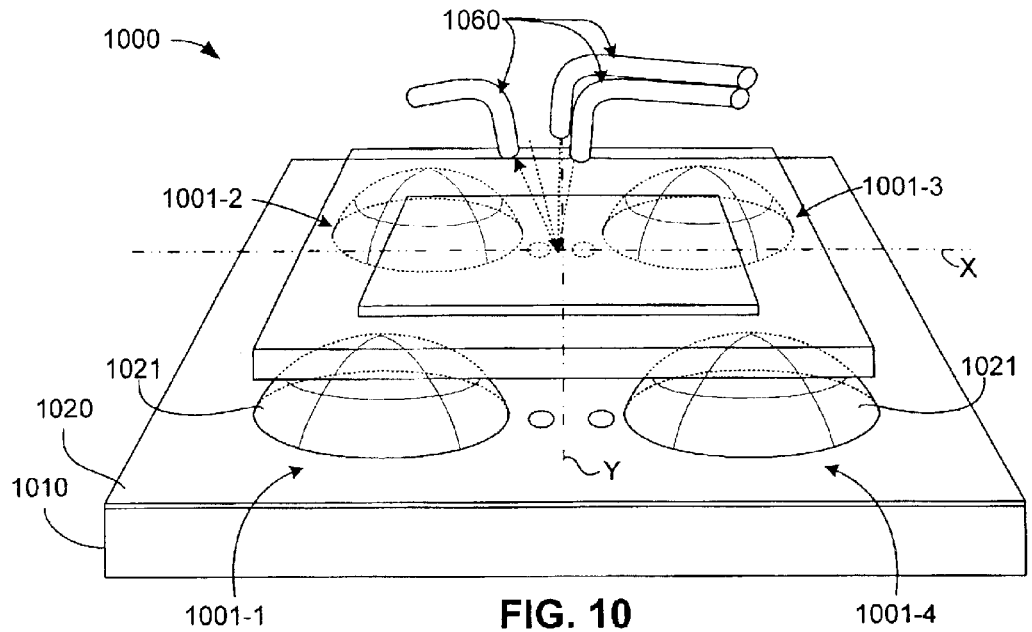
FIG. 10 is an isometric perspective view showing a fiber-optics micro-switch assembly according to another embodiment of the present invention.

FIG. 10 is an isometric perspective view showing a pneumatic fiber-optics micro-switch 1000, which represents an example of an apparatus that utilizes pneumatic actuators as micromachines according to yet another embodiment of the present invention. Micro-switch 1000 includes a pneumatic actuator array including a housing 1010 and a elastomeric membrane 1020, a mirror platform 1050 mounted on elastomeric membrane 1020, and two or more optical fibers 1060 fixedly mounted over mirror platform 1050. Similar to the arrays described above, the pneumatic actuator array 1001 includes four actuators 1001-1 through 1001-4 arranged in a square or diamond pattern, each actuator controlling a portion 1021 of elastomeric membrane 1020 to form distended domes that selectively displace mirror platform 1050 relative to base 1010 in the manner described with reference to the various embodiments set forth above. Mirror platform 1010 includes a mirror 1055 that is located below the ends of optical fibers 1060 such that light emitted by one or more optic fibers is reflected from mirror 1055 to corresponding optic fibers as set forth in the example provided below with reference to FIGS. 11(A) and 11(B). Micro-switch 1000 also utilizes a control circuit (not shown) that facilitates the operations set forth in the following example using known techniques.

Figure 11A:
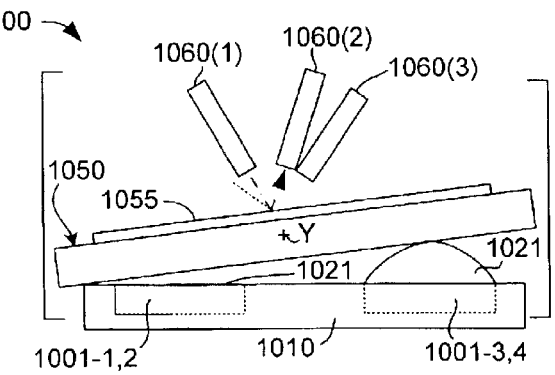
FIGS. 11(A) and 11(B) are simplified front elevation views showing opposing switch states of the micro-switch assembly of FIG. 10.
Figure 11B:
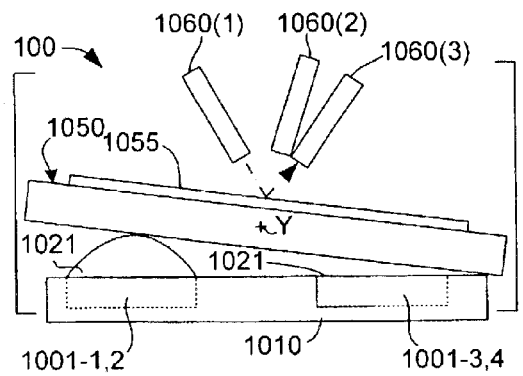

FIGS. 11(A) and 11(B) are simplified front elevation views showing an example of the operation of micro-switch 1000. Referring to FIG. 11(A), when actuators 1001-1 and 1001-2 are turned off and actuators 1001-3 and 1001-4 are turned on, the distended elastomeric material located over actuators 1001-3 and 1001-4 lifts the right side of mirror platform 1050, causing mirror 1055 to rotate (tilt) counter-clockwise around the Y-axis. In this first tilted position, mirror 1055 reflects light transmitted through a first optical fiber 1060(1) from, for example, an optical input device (not shown), to a second optical fiber 1060(2) that is connected to an optical output device (not shown). FIG. 11(B) shows a second switching position that occurs when actuators 1001-1 and 1001-2 are turned on and actuators 1001-3 and 1001-4 are turned off, thereby causing the distended elastomeric material located over actuators 1001-1 and 1001-2 to lift the right side of mirror platform 1050, causing mirror 1055 to rotate (tilt) clockwise around the Y-axis. In this second tilted position, mirror 1055 reflects light transmitted through an optical fiber 1060(1) to a third optical fiber 1060(3) that is connected to yet another optical output device (not shown). Those skilled in the art will recognize that actuators 1001-1 through 1001-4 can be similarly operated to cause mirror 1055 to tilt around the X-axis (see FIG. 1).

Figure 12A:
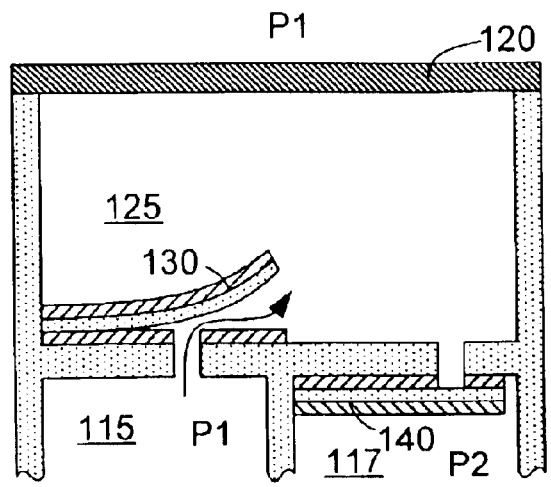
FIGS. 12(A) and 12(B) are partial cross-sectional side views showing a pneumatic actuator according to another embodiment of the present invention.
Figure 12B:
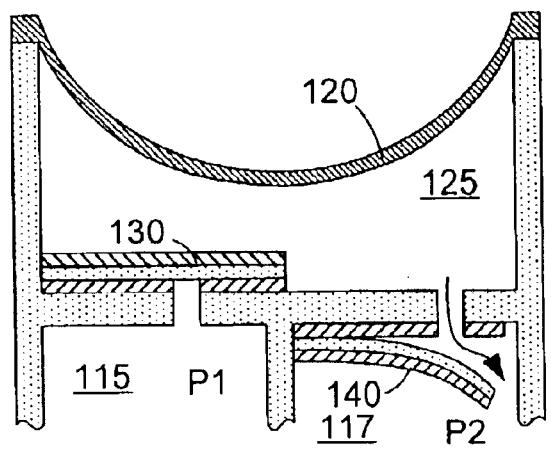

Although the present invention has been described with respect to certain specific embodiments, it will be clear to those skilled in the art that the inventive features of the present invention are applicable to other embodiments as well, all of which are intended to fall within the scope of the present invention. For example, according to one possible alternative embodiment, a pneumatic actuator formed in accordance with the structure described above can be operated in reverse such that membrane is drawn inside the cavity, rather than pushed away from the housing. In particular, as depicted in FIGS. 12(A) and 12(B), an actuator 1200 is arranged such that the pressure P1 maintained in passage 115 is substantially equal to the atmospheric pressure such that membrane 120 flattens when flap valve 130 is opened, and the pressure P2 maintained in passage 115 is lower than P1 such that membrane 120 is drawn into chamber 125 (i.e., assumes a concave instead of convex shape) when flap valve 140 is opened. Note that, for convenience, the phrase "expandable chamber" is defined herein to include the inward distention depicted in FIG. 12(B). This arrangement could be useful, for example, in digital offset lithography for large format signage because is such applications the pixel size would be larger than that needed for high-resolution document printing. In other possible embodiments, the fluid transmitted in the pneumatic actuators can be a liquid instead of a gas. Corrosive or electrically interfering fluids, moreover, can be isolated from the switching mechanism using a valve system similar to that described above with reference to FIG. 9. Furthermore, the elastic membrane can be designed with integrated constraints, such as woven fibers, such that a maximum distention length is fixed at a predetermined value and is independent of variations in pressure above a related threshold value.

What is claimed is:

1. A pneumatic actuator comprising:
   a housing having an upper wall and defining a cavity having an inner wall;
   an elastomeric membrane mounted on the upper wall over the cavity such that the inner wall and the elastomeric membrane form an expandable chamber;
   a first electrostatic flap valve mounted inside the expandable chamber such that the first electrostatic flap valve selectively blocks a first orifice in response to a first control signal; and
   a second electrostatic flap valve mounted outside the chamber such that the second electrostatic flap valve selectively blocks a second orifice in response to a second control signal,
   wherein one of said first and second orifices communicates between the expandable chamber and a pressure source, and
   wherein the other of the first and second orifices communicates with a vent hole defined in the upper wall.

2. The pneumatic actuator according to claim 1, further comprising means for controlling the first and second electrostatic flap valves such that the first electrostatic flap valve is actuated to block the first orifice only when an internal pressure of the chamber is equal to a first pressure supplied to the first orifice, and such that the second electrostatic flap valve is actuated to block the second orifice only when the internal pressure of the chamber is equal to an atmospheric pressure outside of the housing.

3. The pneumatic actuator according to claim 1, wherein the elastomeric membrane comprises a silicone film.

4. The pneumatic actuator according to claim 1, wherein the housing further defines a first passage connected between the first orifice and a first pressure source, and a second passage connected between the second orifice and a second pressure source.

5. The pneumatic actuator according to claim 4, wherein the second pressure source comprises an atmospheric region located outside of the expandable chamber.

6. The pneumatic actuator according to claim 1, wherein the housing comprises a printed circuit board.

7. The pneumatic actuator according to claim 1, further comprising means for limiting a maximum distension length of the elastomeric membrane to a predetermined value.

8. An apparatus including a valve system for controlling fluid flow from a high pressure region to a low pressure region through a plurality of openings formed in a pressure wall located between the high and low pressure regions, wherein the valve system includes a pneumatic actuator array comprising:
   a housing including a substrate defining a plurality of first orifices connected to a first pressure source and a plurality of second orifices connected to a second pressure source;
   an elastomeric membrane mounted on the housing such that the housing and the elastomeric membrane form a plurality of expandable chambers, each expandable chamber being located over a corresponding first orifice and a corresponding second orifice, the elastomeric membrane also being positioned between the housing and the pressure wall;
   a plurality of first electrostatic flap valves, each first electrostatic flap valve being mounted inside an associated expandable chamber for selectively blocking an associated first orifice in response to a first control signal; and
   a plurality of second electrostatic flap valves, each second electrostatic flap valve mounted outside the chamber for selectively blocking an associated second orifice in response to a second control signal,
   wherein the plurality of expandable chambers are arranged such that a portion of the elastomeric membrane located over each expandable chamber is selectively distendable to block a corresponding opening formed in the pressure wall.

9. The apparatus according to claim 8, further comprising means for controlling the first and second electrostatic flap valves such that the first electrostatic flap valve is actuated to block the associated first orifice only when an internal pressure of the chamber is approximately equal to a first pressure supplied by the first pressure source, and such that the second electrostatic flap valve is actuated to block the second orifice only when the internal pressure of the chamber is approximately equal to a second pressure supplied by the second pressure source.

10. The apparatus according to claim 8, wherein the elastomeric membrane comprises a silicone film.

11. The apparatus according to claim 8, wherein the housing further defines a first passage connected between the first orifice and the first pressure source, and a second passage connected between the second orifice and the second pressure source.

12. The apparatus according to claim 8, wherein the plurality of second orifices communicate with the high-pressure region through associated vent holes defined in an upper wall of the housing.

13. The apparatus according to claim 8, wherein the housing comprises a printed circuit board.

14. The apparatus according to claim 8, wherein the apparatus comprises an object handling system, wherein the low-pressure region comprises an object passage, and wherein the openings in the pressure wall comprise air jets.

15. An apparatus including a pneumatic actuator array and a structure mounted on the pneumatic actuator array such that the structure is movable in accordance with an actuated state of the pneumatic actuator array, wherein the pneumatic actuator array comprises:
   a housing including a wall defining a plurality of first orifices connected to a first pressure source and a plurality of second orifices connected to a second pressure source;
   an elastomeric membrane mounted on the housing such that the housing and the elastomeric membrane form a plurality of expandable chambers, each expandable chamber being located over a corresponding first orifice and a corresponding second orifice, the elastomeric membrane also being positioned between the housing and the structure;
   a plurality of first electrostatic flap valves, each first electrostatic flap valve being mounted inside an associated expandable chamber for selectively blocking an associated first orifice in response to a first control signal; and
   a plurality of second electrostatic flap valves, each second electrostatic flap valve mounted outside the chamber for selectively blocking an associated second orifice in response to a second control signal,
   wherein the plurality of expandable chambers are arranged such that a portion of the elastomeric membrane located over each expandable chamber is selectively distendable to displace a corresponding region of the structure.

16. The apparatus according to claim 15, further comprising means for controlling the first and second electrostatic flap valves such that the first electrostatic flap valve is actuated to block the associated first orifice only when an internal pressure of the chamber is equal to a first pressure supplied by the first pressure source, and such that the second electrostatic flap valve is actuated to block the second orifice only when the internal pressure of the chamber is equal to a second pressure supplied by the second pressure source.

17. The apparatus according to claim 15, wherein the elastomeric membrane comprises a silicone film.

18. The apparatus according to claim 15, wherein the housing further defines a first passage connected between the first orifice and the first pressure source, and a second passage connected between the second orifice and the second pressure source.

19. The apparatus according to claim 15, wherein the plurality of second orifices communicate with an atmospheric pressure through associated vent holes defined in an upper wall of the housing.

20. The apparatus according to claim 15, wherein the housing comprises a printed circuit board.

21. The apparatus according to claim 15, wherein the apparatus comprises a fiber optic micro-switch, wherein the structure comprises a mirror platform, and wherein the apparatus further comprises a plurality of optical fibers fixedly mounted over mirror platform.

* * * * *